United States Patent

Kaylor et al.

[11] Patent Number: 5,314,618
[45] Date of Patent: May 24, 1994

[54] OIL SKIMMER

[76] Inventors: Timothy R. Kaylor; Donald R. Weaver, both of Highway 5 South, P.O. Box 1856, Blue Ridge, Ga. 30513

[21] Appl. No.: 38,641
[22] Filed: Mar. 29, 1993
[51] Int. Cl.$^5$ .............................................. C02F 1/40
[52] U.S. Cl. .................... 210/242.3; 210/923
[58] Field of Search ............. 210/242.3, 776, 923, 210/257.1, 258, 259, 242.4, 924

[56] References Cited

U.S. PATENT DOCUMENTS

| | | | |
|---|---|---|---|
| 3,672,277 | 10/1971 | van Stevern | 210/242.3 |
| 3,688,909 | 9/1972 | Titus et al. | 210/923 |
| 4,681,680 | 7/1987 | Delons et al. | 210/242.3 |
| 4,957,636 | 9/1990 | Wilson et al. | 210/242.3 |
| 5,030,363 | 7/1991 | Pole | 210/776 |
| 5,043,065 | 8/1991 | Propp | 210/242.3 |
| 5,194,151 | 3/1993 | Broussard | 210/242.3 |
| 5,200,083 | 4/1993 | Kaylor | 210/242.3 |

Primary Examiner—Christopher Upton
Attorney, Agent, or Firm—Frank A. Lukasik

[57] ABSTRACT

A single drum skimmer and a weir skimmer for recovering all types of oil from a surface of a body of water. An aluminum, high density polyethylene lined drum, floated by adjustable pontoons is rotated clockwise by a hydraulic drive motor, thus drawing the oil layer on top of the water, under and up over the drum to a high density polyethylene scraper blade where it is scraped off into a collection box. The oil runs to the corners of a collection box where it is suctioned off through suction hoses to a camlock "tee" fitting. The oil travels through a main suction hose to a peristaltic master pump which provides suction and discharge of oil from the skimmer to a vacuum dehydrator. An open topped, adjustable reservoir/weir collector has an opening in the front panel which may be opened for weir skimming, and closed for drum skimming.

6 Claims, 3 Drawing Sheets

OIL SKIMMER

BACKGROUND OF THE INVENTION

1. Field of the Invention

This invention relates generally to devices for skimming oil from the surface of water.

More particularly, this invention relates to a single drum skimmer and a weir skimmer for recovering all types of oil from a surface of a body of water, such as oceans, lakes, ponds, rivers and the like, and in particular to an oil retriever that is maneuverable independently on water and can operate efficiently to assist in cleaning up oil spills or other bodies of water containing oil in suspension.

2. Description of the Prior Art

Environment awareness is becoming increasingly more prevalent in response to preservation of the global ecology. The advent of offshore drilling platforms and the use of supertankers to transport crude oil and the like has greatly increased the likelihood and magnitude of catastrophic damage to the oceans lakes, rivers, and ponds by contamination due to spillage on these bodies of water. The damage and destruction from these pollutants can wreak havoc to the ecology that can potentially take decades to recover.

Current methods of cleaning polluted waters have been unsatisfactory, particularly when the conditions have been less than ideal. Speed in cleaning spills is critical due to the rapid spreading of the floating surface material by the currents and wind. Delays may occur in cleaning isolated sites due to problems in transporting the equipment to the site. The turbulence of the oceans or other bodies of water often prevents the equipment from being used.

The apparatus currently used are simple mechanisms such as handheld devices or throwing rags or straw on the surface to absorb the material which are ineffective in cleaning large areas or else complex devices which are expensive to manufacture and to maintain. The complexes devices normally are not effective in completely removing pollutants from the surfaces, particularly when there is a wide depth of the pollutants, turbulence of the surfaces and difficulties in the site conditions.

Other methods utilizing chemicals or burning of the floating material are dangerous to the environment and are simply not feasible for large areas that may need to be cleaned. There presently exists a need for a system to quickly recover floating material such as pollutants or debris from the surfaces of bodies of water without regard to the demands of the particular site conditions.

There are a variety of skimming devices in the prior art. One such skimmer is a weir skimmer, which typically comprises a barrier wall of adjustable height which allows oil floating on water to flow over the wall and into a collection trough while excluding water. Recovered oil is then continuously pumped from the collection trough to a storage or transport means. Weir skimmers operate well in calm water with large or contained spills which produce a relatively thick oil layer.

Disc skimmers ordinarily include a plurality of discs spaced apart coaxially along a rotating shaft which is supported by floats to position the lower portion of the discs in the water. Oil contacts and adheres to the rotating discs is removed by blades or wipers which direct the collected oil into a sump or other collection means.

A mop skimmer, or rope skimmer, is arranged to contact the oil film with an absorbent or filamentous member to which the oil clings. The oil-heavy member is then passed between rollers which squeeze out and collect the oil.

Drum skimmers have also been used for removal of oil and other hydrocarbons from water surfaces. A drum skimmer consists of one or more large rollers, or drums, which rotate partly submerged in water. Oil attaches to the drum surface as the drum rotates through the oil-water interface. The attached oil is then removed by squeezing or scraping the oil from the drum surface.

One example of such a device is shown in the Wilson et al U.S. Pat. No. 4,957,636 which discloses a dual drum skimmer arranged along a common axis which pick up oil and deposit it in a collection trough. Two relatively large diameter drums are mounted on a frame and arranged to rotate about a common axis. A collection trough, which forms the front of the frame, receives oil scraped from the rotating drums. Collected oil is passed to a reservoir trough, which forms the back of the frame, through channels between the two drums and the drum ends. The reservoir trough and the drums are sized to provide all of the buoyancy necessary to float the device.

U.S Pat. No. 3,612,277 to Van Stavern discloses a rotatable drum type of oil skimmer which is continually rotated to pick up a film of oil and water on the surface of the drum, having a supplemental or transfer drum located substantially above the oil slick and well out of contact with the oil slick, picking up the oil from the first drum and depositing it in a trough.

U.S. Pat. No. 5,043,064 to Abell et al discloses a pair of hulls interconnected by a deck structure. A perforated drum has a covering which is comprised of an oleophilic material. The covering in an alternative embodiment has bristles or brushes. A doctor blade contacts the covering of the drum to remove oil or debris from the drum for deposit into a sump.

U.S. Pat. No. 5,030,363 to Pole discloses an oil retriever with interchangeable collection tanks. Across the front of pontoons, a cylindrically shaped drum is rotated about its longitudinal axis by a reversible, variable speed motor. There are two scrapers extending along the entire rearward side of the drum. U.S Pat. No. 4,978,448 to Terekomos discloses a system using an elongated scoop, and U.S. Pat. No. 5,137,630 to Eklund discloses a system using brush discs and a comb member for separating oil from the brush discs.

None of the above prior art devices are as easily transportable, rugged in construction, nor as effective in cleaning up large areas as the instant invention or else are complex devices which are more expensive to manufacture and to maintain.

SUMMARY OF THE INVENTION

The present invention provides a system for recovering floating oils or petroleum products from the surfaces of bodies of water. The invention provides two methods of recovering surface oils, a rotating drum skimmer and/or a weir skimmer. An aluminum, high density polyethylene lined drum floated by adjustable pontoons is rotated clockwise by a hydraulic drive motor, thus drawing the oil layer on top of the water, under and up over the drum to a high density polyethylene scraper blade where it is scraped off into a collection box. The oil runs to the corners of a collection box where it is suctioned off through suction hoses to a camlock tee fitting. The oil travels through a main suction hose to a peristaltic master pump which provides suction and discharge of oil, gasoline, diesel, etc., from the skimmer to a dehydrator. The oil is processed through a vacuum chamber where the oil has all water and dirt particles removed.

It is one object of the invention to provide an improved apparatus for collecting waste material, such as oil and/or debris from the surface of a body of water.

Another object of the invention is to provide an apparatus for collecting waste material from the surface of a body of water which aids in separating the water and waste material.

A further object of the invention is to provide a floating apparatus for collecting oil and debris from the surface of the water which has an improved collection and separation means.

This invention relates to the above features and objects individually and in combination. Other objects, features and advantages of the present invention will be apparent from the following description of preferred embodiments thereof and from the attached drawings.

DETAILED DESCRIPTION OF THE PREFERRED EMBODIMENT

Figure 1:
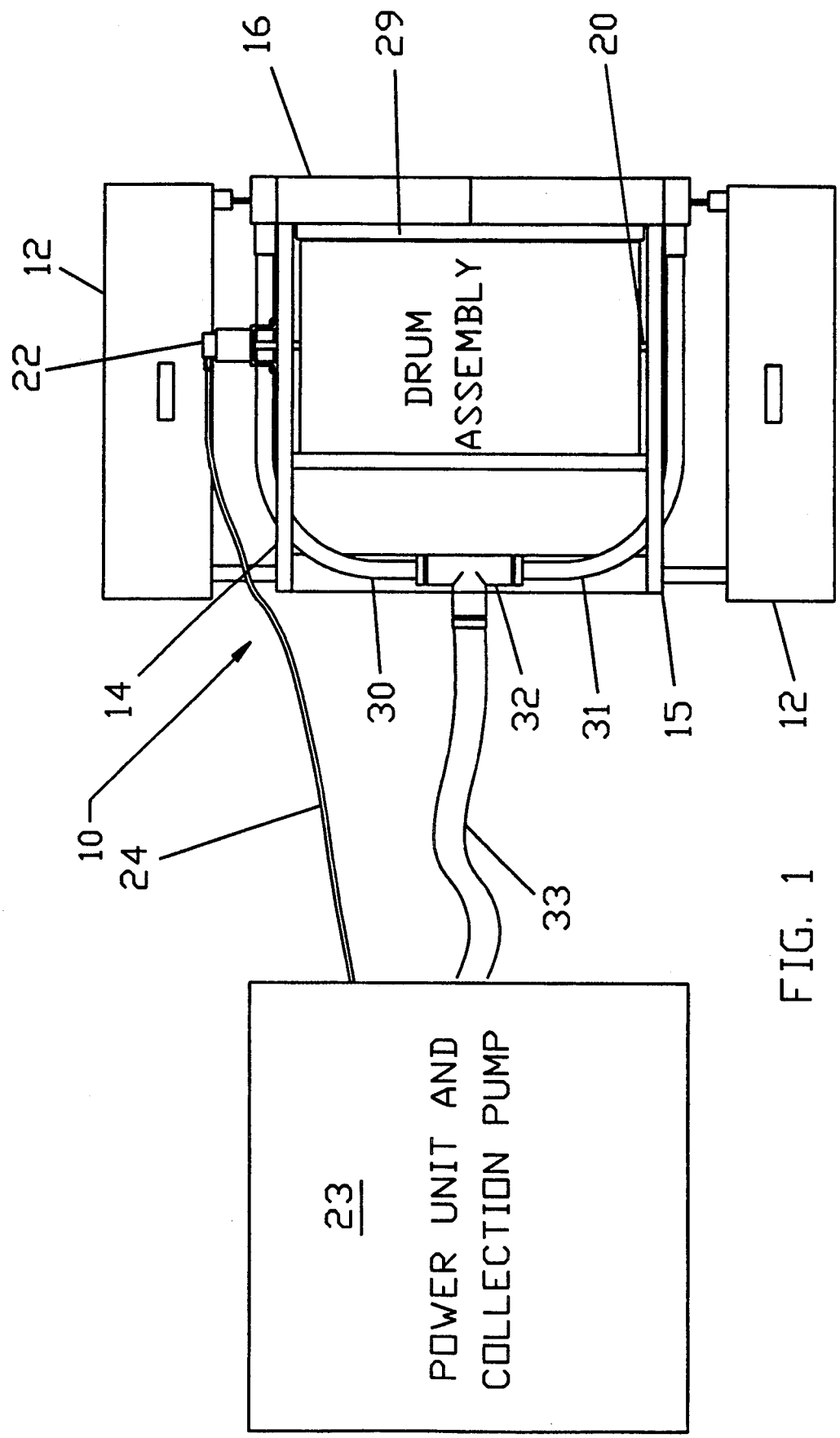
FIG. 1 is a top view of the invention.
Figure 2:
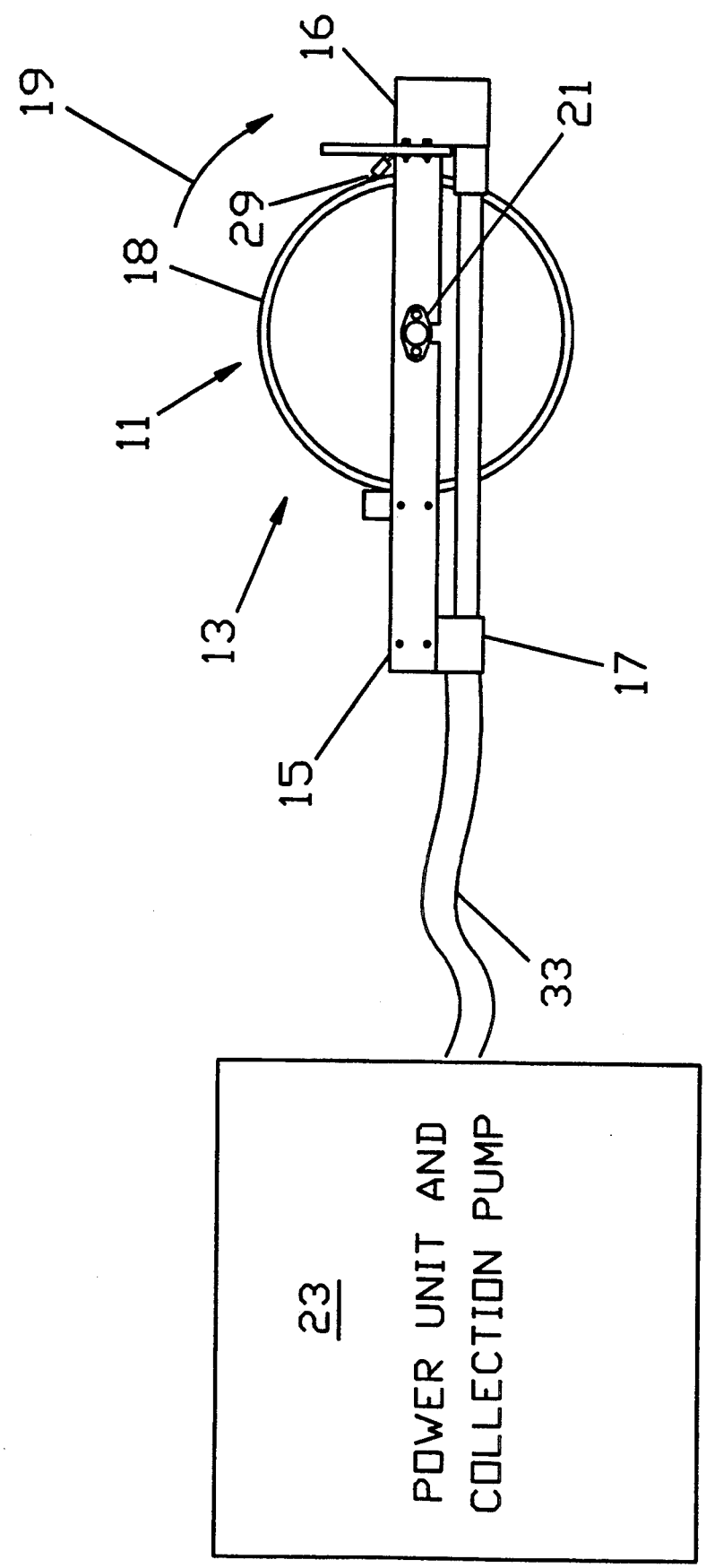
FIG. 2 is is a side view of the invention with the pontoons omitted.
Figure 3:
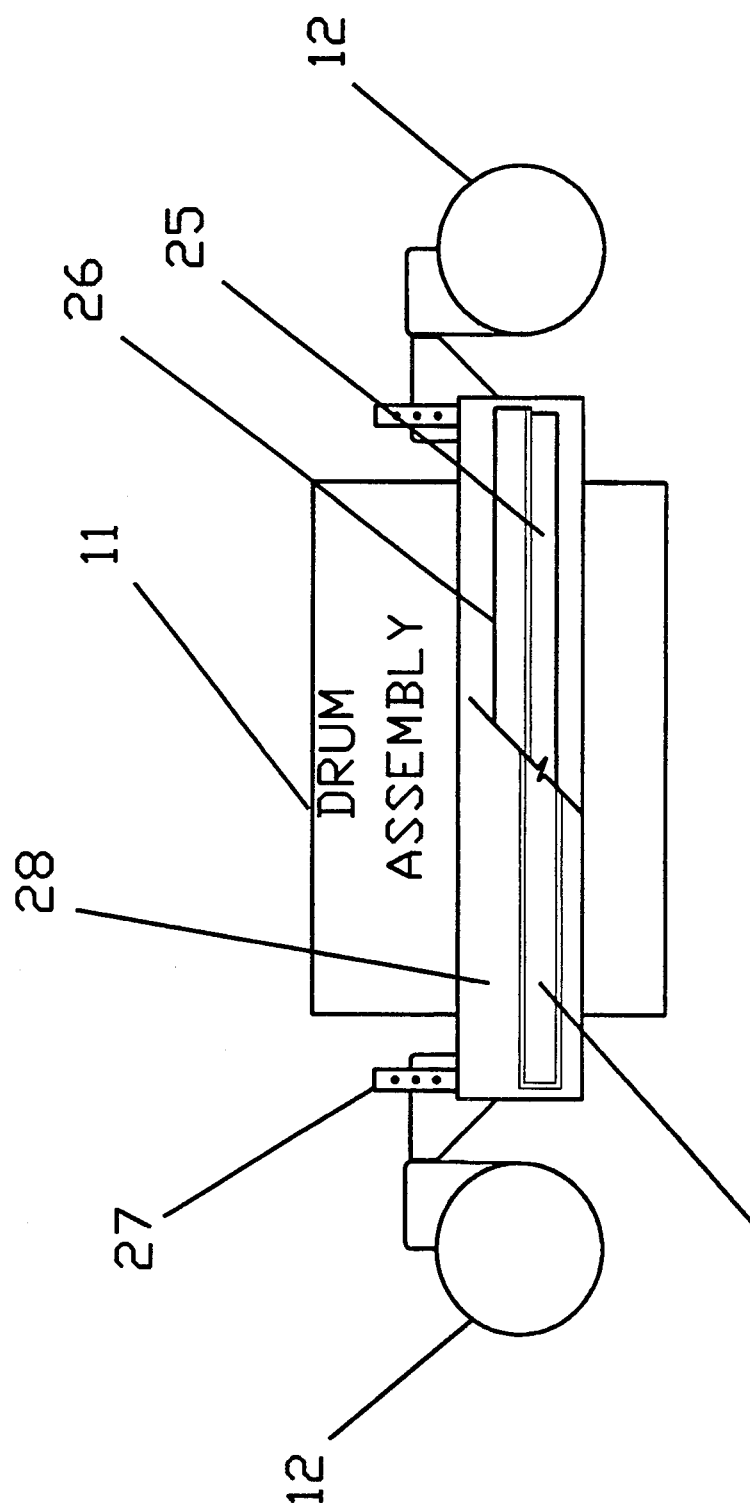
FIG. 3 is a front view of the invention in two positions without the power unit and collection pump.

Referring now to FIGS. 1-3, a description of a preferred embodiment will be described. The skimmer of the invention is designated by the numeral 10. The skimmer drum 11 is placed on the water surface and supported by a pair of pontoon hulls 12 which are located in a spaced-apart, parallel relationship to create a floating structure for floating on a body of water. The drum 11 may be fabricated from aluminum, and a high density polyethylene sleeve 18 is slipped over the outside of drum 11 to provide the oil adhering surface. A frame 13, consisting of parallel side bars 14, and 15, adjustable reservoir/weir collector 16, and rear wall 17, is fastened to and suspended from the pontoon hulls 12. The skimmer drum 11 is mounted in the frame between parallel side bars 14 and 15 with the axis of rotation parallel to the front frame member collector 16 and is arranged for rotation in the direction indicated by arrow 19. A first end of the drum shaft 20 is supported by bearing 21, a second end of the drum shaft 20 is driven by a hydraulic drive motor 22. In a preferred embodiment, a Dan Foss hydraulic pump, Model OMM 32 was used. In operation, the skimmer drum 11 rotates at 1-25 RPM depending on the thickness and viscosity of the oil to be skimmed. Hydraulic power is provided by power unit and collection pump 23, through flexible hydraulic supply line 24.

The adjustable reservoir/weir collector 16 is open topped and has an opening 25 in front panel 28 to admit oil when in the weir skimming mode. When the conditions are appropriate for drum skimming, door 26 is closed to seal the opening 25 in front panel 28. The collector 16 level is adjusted by changing its position on mounting brackets 27.

Scraper blade 29 is mounted across parallel side bars 14 and 15 and in contact with drum 11. Scraper blade 29 is preferably made of high density polyethylene and is set to bear against the drum 11 to separate the oil from the drum 11 and direct the oil into collector 16. When the skimmer 10 is deployed in water, the depth at which the weir collector 16 and the depth to which the drum 11 is immersed is set by either raising or lowering the level of the skimmer 10 with relation to the pontoon hulls 12.

Conduits 30 and 31, connected at either end of collector 16 are provided to remove fluid from the collector 16. Conduits 30 and 31 are brought rearward where they are connected to a camlock tee fitting 32, and a flexible collection hose 33 completes the connection to the power unit and collection pump 23 which may conveniently be located on a boat, ship, barge, or onshore. Movement of the skimmer 10 along the surface of the water is caused by the forward pulling power of the rotation of the drum 11 due to friction of the drum 11 in the fluid being collected.

Power unit and collection pump 23 may also include a vacuum dehydrator which uses a vacuum process to remove water, light hydrocarbons, and solid contaminants. For those applications requiring recycling or salvaging of fluids, an Enervac Corporation Model E859A vacuum oil-dehydrator may be used. In particular, the dehydrator may be used in such applications as lubricating oils, hydraulic oils, turbine oils, compressor seal oils, synthetic fluids, insulating oils, cutting and cooling mineral oils and quenching oils.

OPERATION

The skimmer 10 is placed on the water, and is held in the proper operating height by pontoon hulls 12. The aluminum and plastic lined drum 11 is rotated clockwise at the appropriate speed by the hydraulic drive motor 22. The drum 11 draws the oil layer on the top of the water, under and up over the drum, where the oil is removed by scraper blade 29 and flows into the collector 15. The drum 11 is rotated between 1 to 25 revolutions per minute depending on the thickness and viscosity of the oil. The oil flows to the corners of the collector where it is drawn through the conduits 30 and 31, to the camlock "tee" fitting 32. The oil travels through flexible collection hose 33 to a peristaltic master pump located in power unit and collection pump 23, which provides suction and discharge of oil, gasoline, deisel, etc. from the skimmer 10 to the dehydrator located in power unit and collection pump 23. The oil is processed through a vacuum chamber which removes the water and dust particles. The oil is now ready for reuse. In addition to clearing bodies of water from oil and other pollutants, treatment of the oil for reuse not only protects the environment, but preserves natural resources. It has been found that recovery and treatment of oils such as those used in manufacturing processes for cooling and lubricating, is far more cost-effective than disposing of used oils and purchasing of new oils.

In cases where large amounts of oil are spilled, as in the case of the Exxon Valdez oil spill, where speed and volume are critical in reducing the amount of environmental damage, the dehydrator process may be omitted and the collected oil may be pumped into a barge or other container for further processing. In such cases, the reservoir/weir collector 16 may be adjusted to a level where the opening 25, with the door 26 open, will be gathering oil from the surface as it is being moved forward through the oil spill. It has been found that the weir skimmer and the drum skimmer of the invention meet the requirements of the U.S. Coast Guard for recovery of oil spills.

Of course, it should be understood that a wide range of changes and modifications can be made to the preferred embodiment described above. It is, therefore, intended that the foregoing descriptions be regarded as illustrative rather than limiting, and that it be understood that it is the following claims, including all equivalents, which are intended to define the scope of the invention.

We claim:

1. An apparatus for removing oil from the surface of a body of water comprising:

a pair of spaced-apart hulls, a support frame of generally rectangular shape having a front, a back, and two sides, said frame adjustably supported by said hulls, said front forming an oil collection reservoir, and having a top opening, and a front opening therein, and having a door pivoted thereon for closing said front opening in a first position and for forming a weir skimmer in a second position, and said back having a pair of oil removal drain holes at opposite ends thereof, a rotatable drum having an external oil collecting surface, with upper and lower portions and a longitudinal center line, means for rotatably mounting and rotating said drum in a partially submerged position with at least a portion of the lower surface being positioned in the water, said upper portion being positioned out of the water, and with the longitudinal line of said drum extending in a direction across the space between said sides, scraper means mounted on said front of said support frame above said top opening of said reservoir and positioned to engage said upper portion of said drum for removing oil from said drum and deflecting oil into said reservoir, conduit means affixed at a first end to said oil collection reservoir and communicating with said oil removal drain holes, and connected at a second end to a "tee" fitting, and power means connected to said means for rotating said drum, and collection means connected to said "tee" fitting for pumping the collected oil for further processing or disposal.

2. An apparatus for removing oil from the surface of a body of water according to claim 1 wherein said collection means includes a vacuum dehydrator for removing water, light hydrocarbons and solid contaminants from the recovered oil.

3. An apparatus for removing oil from the surface of a body of water according to claim 1 wherein said oil collecting surface and said scraper means consist of high density polyethylene.

4. An apparatus for removing oil from the surface of a body of water according to claim 1 wherein said means for rotating said drum consists of a hydraulic drive motor.

5. An apparatus for removing oil from the surface of a body of water comprising:

a pair of spaced-apart pontoon hulls, a support frame of generally rectangular shape having a front, a back, and two sides, said frame adjustably supported by said hulls, said front forming an oil collection reservoir, and having a top opening, and a front opening therein, and having a door pivoted thereon for closing said front opening in a first position and for forming a weir skimmer in a second position, and said back having a pair of oil removal drain holes at opposite ends thereof, a rotatable aluminum drum having an external, high density polyethylene oil collecting surface, with upper and lower portions and lower portions and a longitudinal center line, means for rotatably mounting and rotating said drum in a partially submerged position with at least a portion of the lower surface being positioned in the water, said upper portion being positioned out of the water, with the longitudinal line of said drum extending in a direction across the space between said sides, and said rotating means consisting of a hydraulic drive motor, a high density polyethylene scraper mounted on said front of said support frame above said top opening of said reservoir and positioned to engage said upper portion of said drum for removing oil from said drum and deflecting oil into said reservoir, a pair of conduit means affixed at a first end to said oil collection reservoir and communicating with said oil removal drain holes, and connected at a second end to a "tee" fitting, and a hydraulic pump connected through a flexible hydraulic supply line to said hydraulic motor for rotating said drum, and a peristaltic master collection pump having a flexible collection hose connected to said "tee" fitting for pumping the collected oil for further processing or disposal.

6. An apparatus for removing oil from the surface of a body of water according to claim 5 including a vacuum dehydrator for processing the oil and removing water, light hydrocarbons and solid contaminants from the recovered oil.

* * * * *